(12) United States Patent
Droesbeke

(10) Patent No.: US 9,784,929 B2
(45) Date of Patent: Oct. 10, 2017

(54) BOARD CONNECTOR

(71) Applicant: FCI Asia PTE. LTD, Singapore (SG)

(72) Inventor: Gert Droesbeke, Saint-Vit (FR)

(73) Assignee: FCI Asia Pte. Ltd., KA Place (SG)

( * ) Notice: Subject to any disclaimer, the term of this patent is extended or adjusted under 35 U.S.C. 154(b) by 0 days.

(21) Appl. No.: 14/438,248

(22) PCT Filed: Oct. 29, 2012

(86) PCT No.: PCT/IB2012/002649
§ 371 (c)(1),
(2) Date: Apr. 24, 2015

(87) PCT Pub. No.: WO2014/068349
PCT Pub. Date: May 8, 2014

(65) Prior Publication Data
US 2015/0277067 A1    Oct. 1, 2015

(51) Int. Cl.
  G02B 6/32    (2006.01)
  G02B 6/42    (2006.01)
  G02B 6/38    (2006.01)

(52) U.S. Cl.
  CPC ......... *G02B 6/4214* (2013.01); *G02B 6/3897* (2013.01); *G02B 6/423* (2013.01); *G02B 6/4212* (2013.01); *G02B 6/4249* (2013.01); *G02B 6/4292* (2013.01); *G02B 6/3893* (2013.01)

(58) Field of Classification Search
  CPC .... G02B 6/3897; G02B 6/4212; G02B 6/423; G02B 6/4249; G02B 6/4292

USPC ......................................... 385/33, 36, 88–92
See application file for complete search history.

(56) References Cited

U.S. PATENT DOCUMENTS

| | | | |
|---|---|---|---|
| 6,034,821 A * | 3/2000 | Schenfeld ............ | G02B 6/4249 359/618 |
| 7,399,125 B1 | 7/2008 | Whaley et al. ................ | 385/92 |
| 8,262,297 B2 * | 9/2012 | Castagna ............ | G02B 6/4292 385/52 |
| 8,317,411 B2 * | 11/2012 | Fujiwara .............. | G02B 6/4292 385/92 |
| 8,414,199 B2 * | 4/2013 | Ishigami .............. | G02B 6/4292 385/15 |
| 8,465,213 B2 * | 6/2013 | Tamura ................ | G02B 6/4201 385/92 |
| 2002/0076173 A1* | 6/2002 | Jiang ...................... | G02B 6/421 385/91 |
| 2004/0101265 A1* | 5/2004 | Jong .................... | G02B 6/3807 385/134 |

(Continued)

FOREIGN PATENT DOCUMENTS

EP        2 402 804 A1    1/2012
WO    WO 2012/017263 A1    2/2012

*Primary Examiner* — Ellen Kim
(74) *Attorney, Agent, or Firm* — Wolf, Greenfield & Sacks, P.C.

(57) ABSTRACT

Opto-electric on-board including opto-electronic elements on a substrate and an optical coupling, device for transferring optical signals between the opto-electronic elements and a complementary optical cable connector. The optical coupling device includes a prism with a contact face and a lower face and two or more supports spacing each the lower face from the oppositely arranged opto-electronic elements. Each support includes one or more feet attached to the substrate.

20 Claims, 9 Drawing Sheets

(56) References Cited

U.S. PATENT DOCUMENTS

2008/0232737 A1    9/2008  Ishigami et al. ............... 385/14
2010/0142910 A1*   6/2010  Hill ..................... G02B 6/4454
                                                           385/135

* cited by examiner

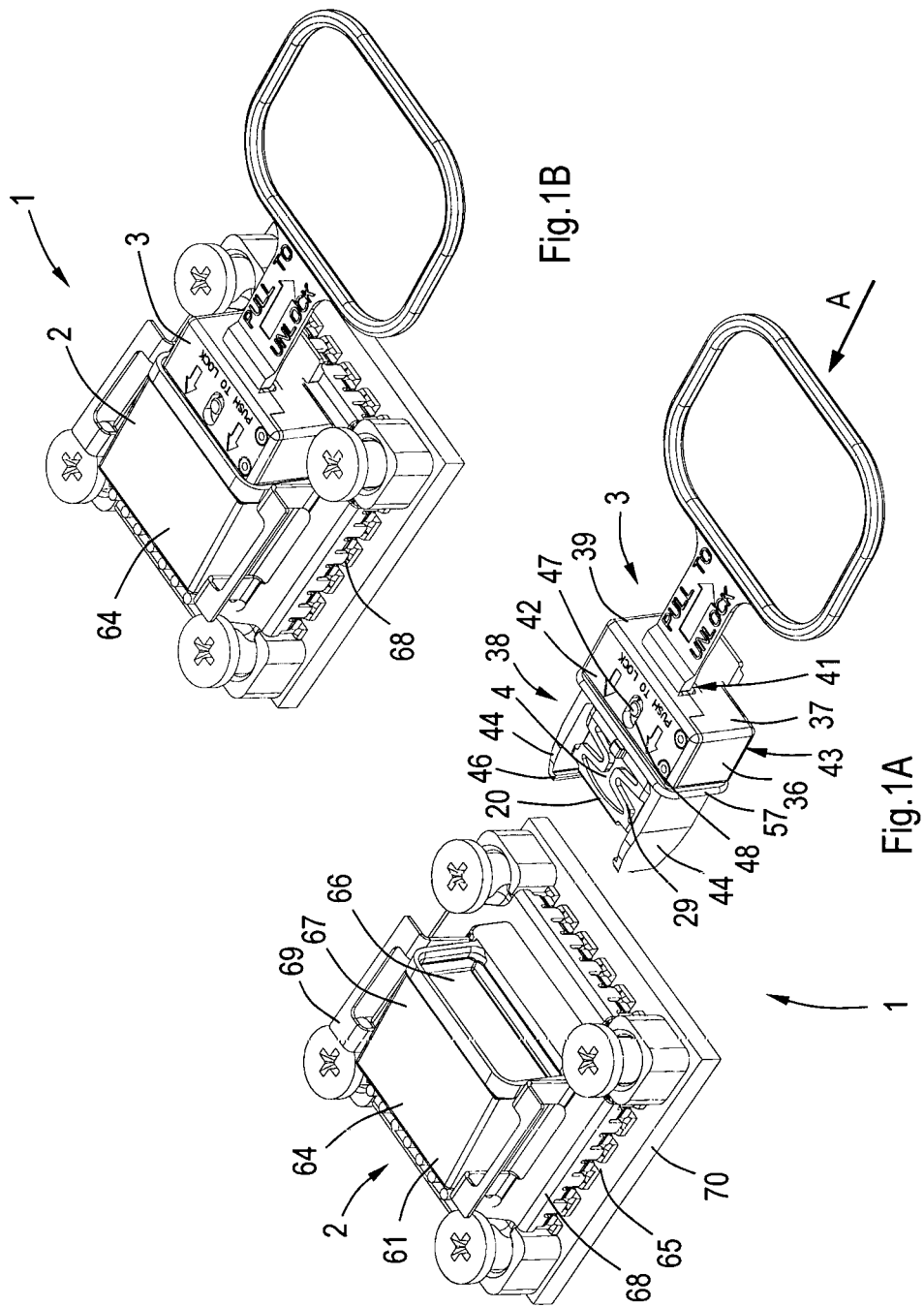

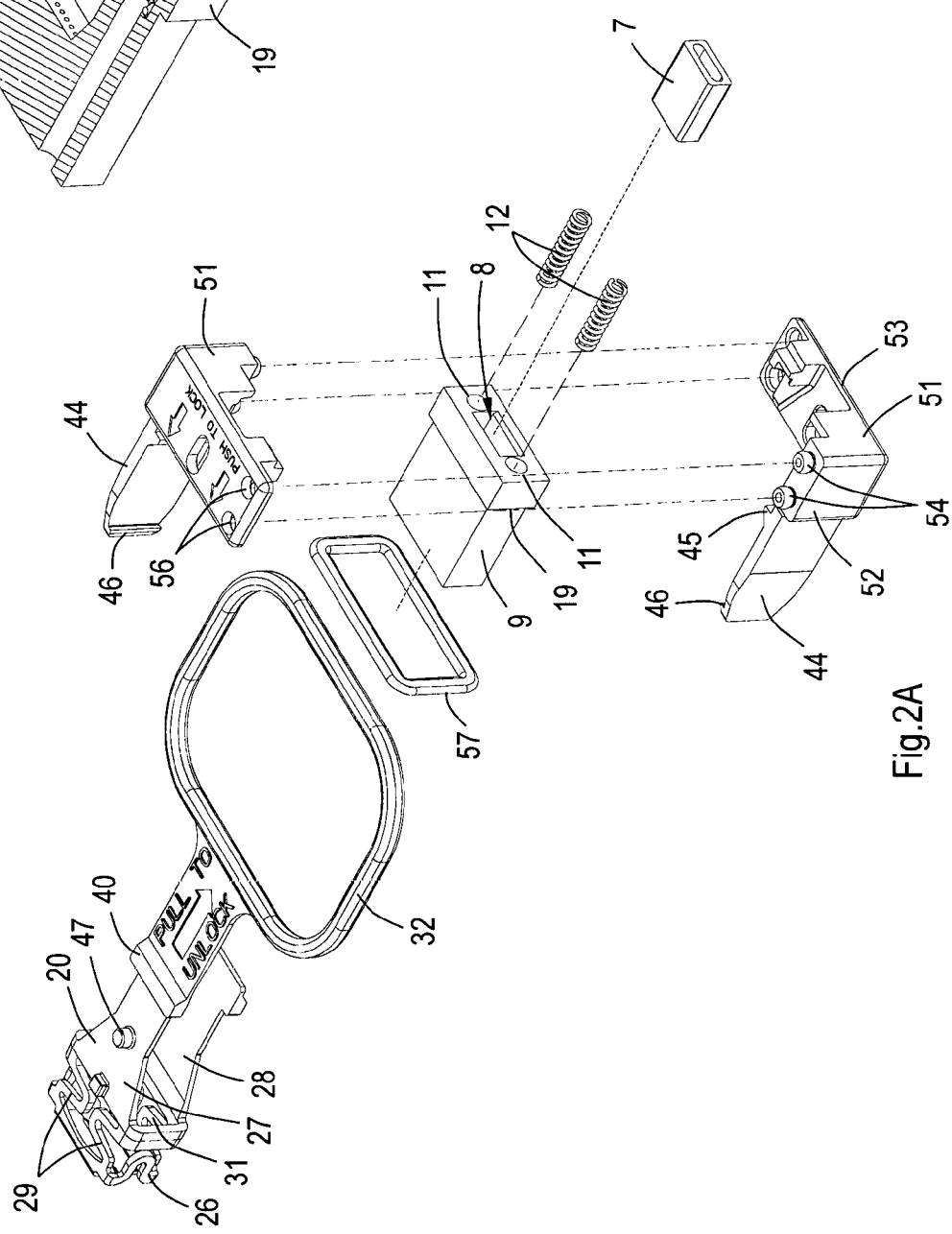

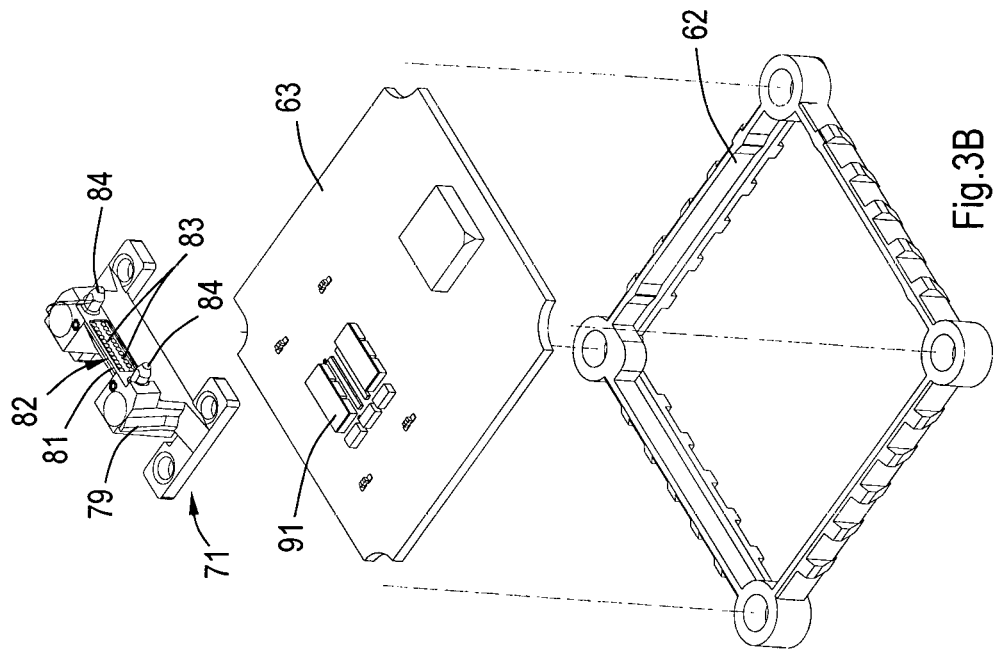
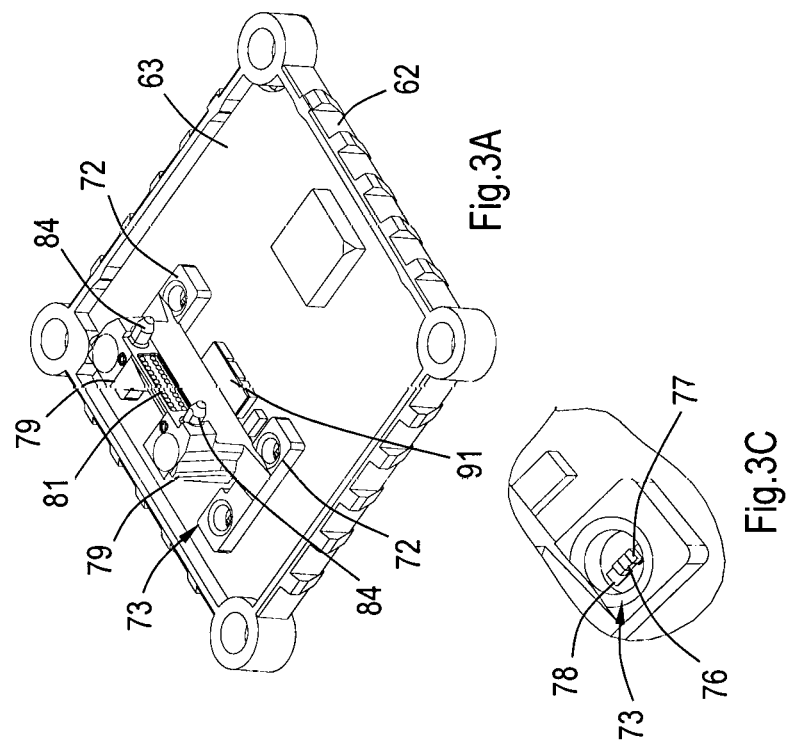

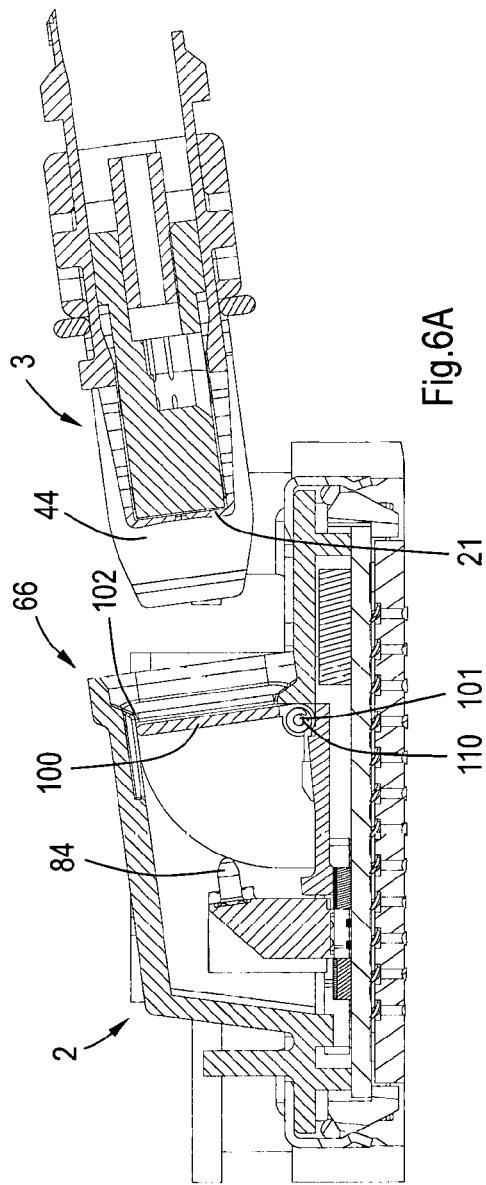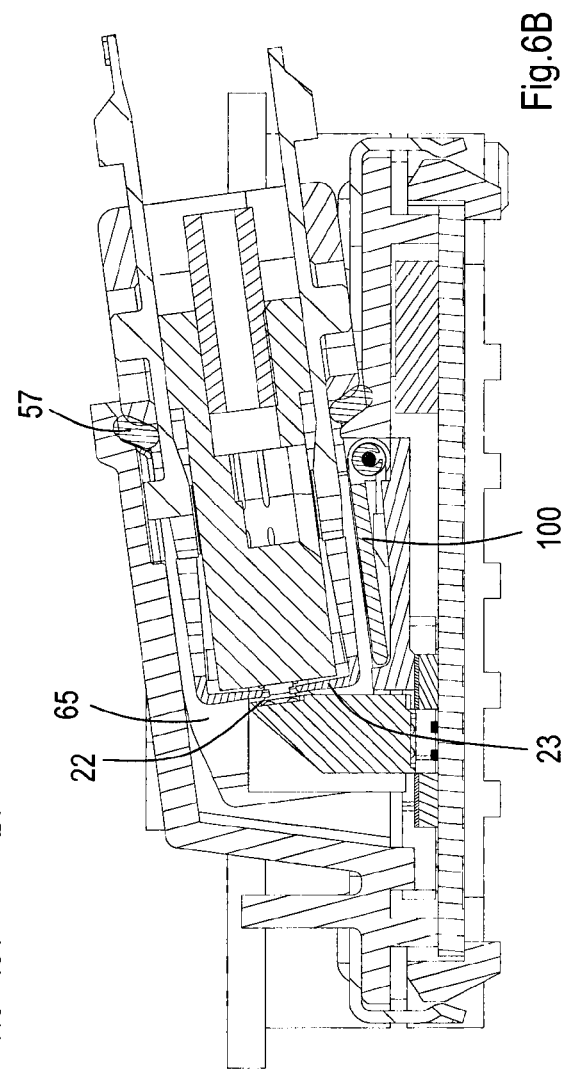

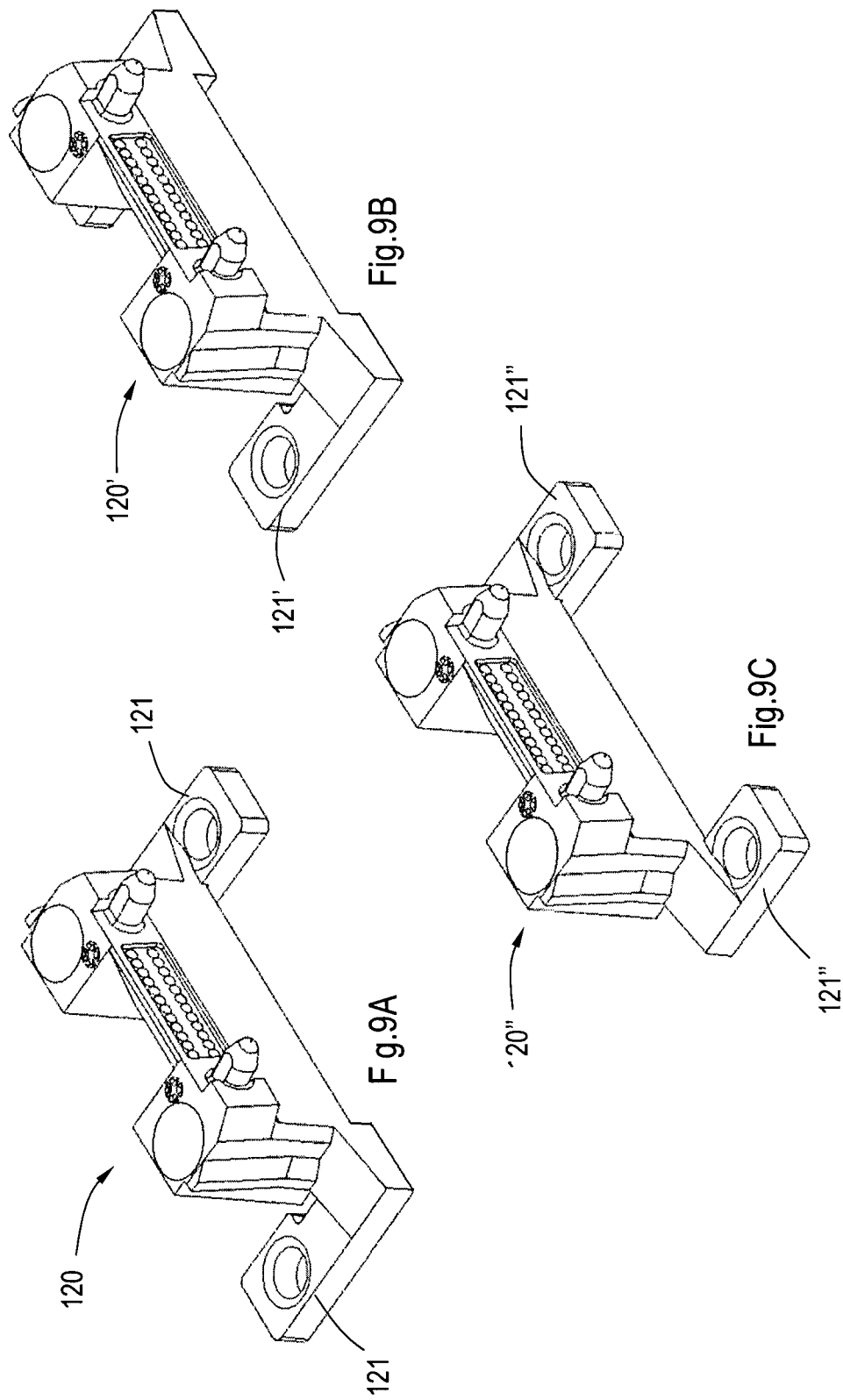

BOARD CONNECTOR

RELATED APPLICATIONS

This application is the U.S. National Stage of and claims priority to and the benefit of International Patent Application No. PCT/IB2012/002649, entitled "BOARD CONNECTOR" filed on Oct. 29, 2012, which is herein incorporated by reference in its entirety.

FIELD OF THE DISCLOSURE

The invention relates to a board connector for connecting a complementary second connector, such as an optical cable connector, to a substrate, such as a printed circuit board. The connector comprises one or more elements mounted on the printed circuit board, such as an optical coupling device for receiving light signals to be guided to a transducer on the substrate.

BACKGROUND OF THE DISCLOSURE

When the complementary second connector is brought into engagement with the board connector, the internals of the board connector can be dislocated. Small changes of the position of internal elements involved in signal transfer, can result in substantial loss of signal integrity. These internals can for instances be mounted to the board by means of an adhesive. This results in shear stresses in the adhesive.

This problem particularly occurs with optical cable connectors, which must be pressed against a light receiving element in order to achieve accurate positioning and reliable fixation.

It is an object of the present invention to provide a more reliable way of fixating the positions of board connector elements in a reliable and stable manner.

SUMMARY OF THE DISCLOSURE

An opto-electric on-board connector is disclosed comprising:
opto-electronic elements, such as VCEL's and/or pin-diodes and associated drivers and circuitry;
an optical coupling device for guiding optical signals between the opto-electronic elements on a substrate, such as a transceiver board, and a complementary optical cable connector
wherein the optical coupling device comprises a prism with a contact face and a lower face;
wherein the optical coupling device further comprises two or more supports spacing each the lower face from the oppositely arranged opto-electronic elements;
wherein each support comprises one or more feet attached to the substrate.

The supports accurately space the lower face at a desired distance of the opto-electronic elements. The feet enable a firm and reliable attachment to the substrate, also during mating or unmating of a complementary connector.

In use, each lens of the first array faces a terminal end of an associated optical fiber of the complementary optical cable connector.

The opto-electronic elements can for instance be positioned on a bottom surface of the transceiver, such as an inner connector board or substrate.

Each support can for example comprise two oppositely extending feed to define an H-shape of the optical coupling device in plan view. Such feet can be used to balance forces exerted by pushing a complementary connector against the optical coupling device.

The connector will typically comprise a housing encasing the optical coupling device and the opto-electronic elements. To improve heat dissipation, the housing may be made of an thermoconductive material.

The opto-electronic elements can for example include VCEL's VCEL's (Vertical-cavity surface-emitting lasers), which can receive and emit light signals, and/or PIN photodiodes which can only receive light signals from the oppositely arranged array of lenses of the optical coupling device. VCEL's and PIN diodes are controlled by drivers, which generate heat. If the drivers are positioned between the feet of the optical coupling device supports, the drivers are at short distance of the associated opto-electronic elements while the generated heat can be dissipated effectively.

Heat dissipation can be further optimized if the housing comprises an interior surface profiled to provide a tight contact with the upper surfaces of the drivers, in such a way that there are no substantial in gaps left. Air gaps substantially reduce heat dissipation. In order to avoid the presence of air gaps, thermally conductive gap filling material can be applied between the drivers and the interior housing surface. Suitable gap filling materials are for example Tpli® and Tflex® of Laird Technologies.

The support and the feet of the optical coupling device can for example be bonded to the substrate by an adhesive, such as UV-curable or thermally curable adhesives, e.g., a UV-curable or thermally curable epoxy adhesive or mixtures thereof.

In a specific embodiment, the prism of the optical coupling device, may comprise a light-reflective back face under an angle to guide optical signals from each lens of the first array of the contact face to an associated lens of the second array at the prisms lower surface.

To align the optical coupling device and a complementary cable connector, the optical coupling device can for example comprise alignment features, such as alignment pin, flanking the first array of lenses, the alignment features matching with corresponding alignment features of a complementary cable connector. The alignment features of the optical coupling device may for instance include parallel alignment pins extending in a direction under right angles with the contact face.

Optionally, the supports have side faces profiled to cooperate with latches of a complementary cable connector.

In an specific embodiment, the supports of the optical coupling device can be provided with flat top faces to enable using vacuum nozzle pick and place systems for positioning the optical coupling device during the assembling process.

BRIEF DESCRIPTION OF THE DRAWINGS

The invention will be further explained under reference to the accompanying drawings.

FIG. 1A: shows an exemplary embodiment of a connector with a complementary second connector;

FIG. 1B: shows the two connectors of FIG. 1A in an assembled state;

FIG. 2A: shows the second connector of FIG. 1 in exploded view;

FIG. 2B: shows in perspective cross section a cable connection of the connector of FIG. 2A;

FIG. 3A: shows in perspective view the internal configuration with an optical coupling device member of the connector of FIG. 1;

FIG. 3B: shows the configuration of FIG. 3A in exploded view;

FIG. 3C: shows in detail a mounting section of the optical coupling device member of FIG. 3A;

FIG. 6A: shows in cross section the connector and the complementary connector of FIG. 1 just before being mated;

FIG. 6B: shows the connector and the complementary connector of FIG. 1 just after being mated in cross section along a vertical plane;

FIG. 9A: shows an alternative embodiment of an optical coupling device;

FIG. 9B: shows an alternative embodiment of an optical coupling device;

FIG. 9C: shows an alternative embodiment of an optical coupling device.

DETAILED DESCRIPTION OF EMBODIMENTS

Figure 4C:
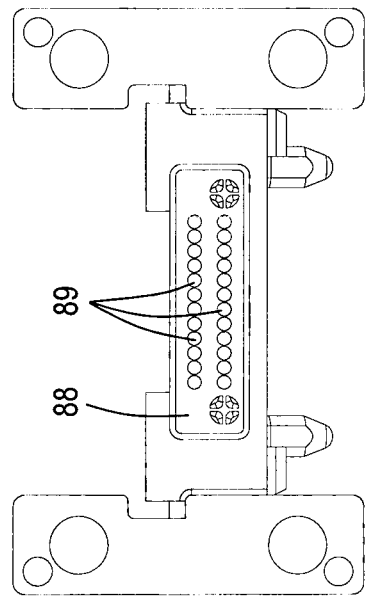
FIG. 4C: shows the optical coupling device member of FIG. 3A in top view.

FIGS. 1A and 1B show an exemplary embodiment of a connector assembly 1 of a board connector 2 and a complementary optical cable connector 3. In FIG. 1A, the optical cable connector 3 is moved in a mating direction A to be connected to the board connector 2, as shown in FIG. 1B.

The optical connector 3 comprises a plug 4 at the end of an optical cable (not shown). The plug 4 is shown in exploded view in FIG. 2A and comprises a rectangular cable bent relief 7 of a rubber-like material holding the end of the optical cable to protect the fibers from overstressing by bending. The cable holder 7 is partly inserted into a matching rectangular opening 8 in a ferrule 9. The rectangular opening 8 is flanked by two cylindrical openings 11, each holding one end of a compression spring 12. Openings 13 of a smaller diameter extend coaxially from the cylindrical openings 11 to the opposite end 14 of the ferrule 9. This end exposes the terminal ends of the optical fibers 15 (see FIG. 5B). A shoulder 16 is formed between the larger openings 11 and the smaller openings 13. The compression springs 12 abut the shoulder 16.

The ferrule 9 has a central opening 17 filled with a cured adhesive fixating the fiber ends within the ferrule 9.

Figure 5B:
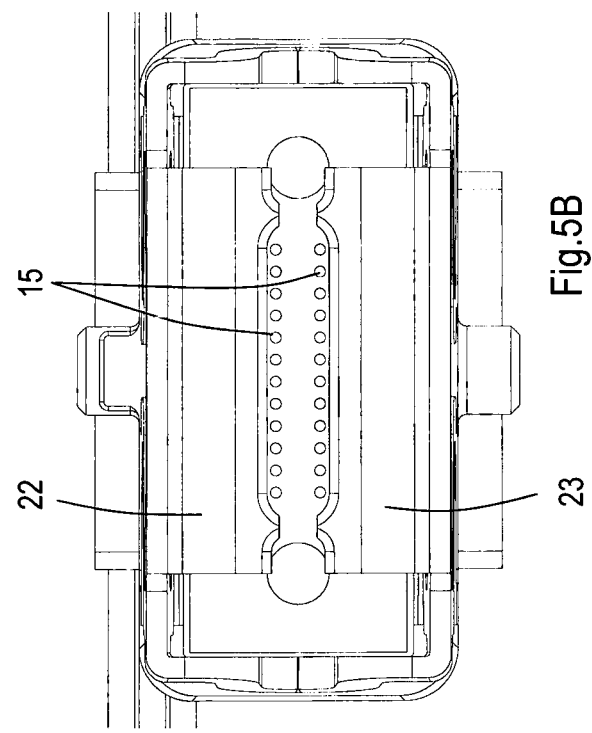
FIG. 5B: shows the second connector in front view during connection with the first connector.
Figure 5A:
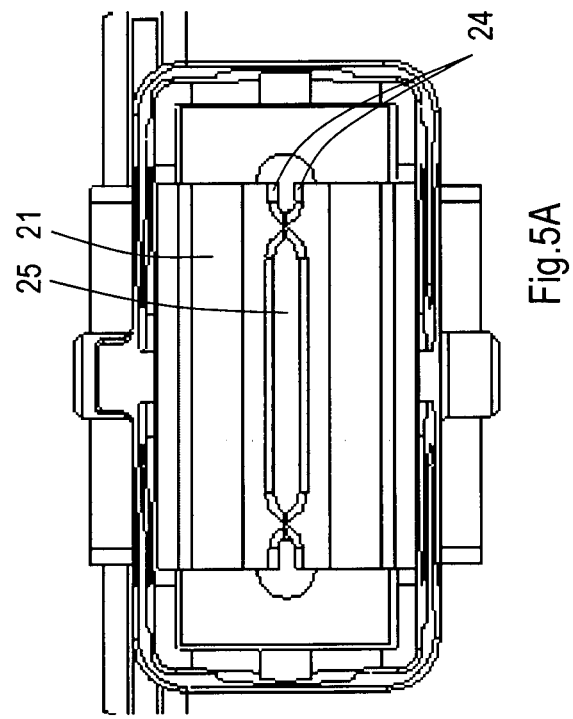
FIG. 5A: shows the second connector in front view.

The ferrule 9 is capped by release member 20. The release member 20 is a single piece, e.g., of a resilient elastomeric material, and comprises a shutter 21 hiding the end 14 of the ferrule 9. As shown in FIGS. 5a and 5B, the shutter 21 is formed by an upper blade 22 and a lower blade 23 which can be separated to expose the optical fibers 15 when the cable connector 3 is connected to the board connector 2. The upper and lower blades 22, 23 face each other with edges provided with spacers 24 creating a split 25.

The release member 20 further comprises a U-shaped resilient bridge 26 at lateral both sides of the ferrule 9. The U-shaped bridges 26 bias the blades 22, 23 towards each other. In this position the shutter 21 closes off the terminal ends of the optical fibers 15, protecting the fiber ends against moisture, dirt and mechanical impact.

An upper web 27 of the release member 20 covers the top side of the ferrule 9. Similarly, a lower web 28 is provided below the lower side of the ferrule 9. One end of the upper web 27 is resiliently connected to the upper ends of the two U-shaped bridges 26 and the upper blade 22 by means of two mirrored C-shaped resilient members 29 symmetrically arranged back-to-back in a mirrored manner. Similarly, one end of the lower web 28 is resiliently connected to the lower ends of the two U-shaped bridges 26 and the lower blade 23 by means of two similarly mirrored C-shaped resilient members 31.

At the cable side of the plug 4 the upper web 27 of the release member 20 is connected to a pull tab 32, which can be pulled by a user to disconnect the cable connector 3, as will be explained hereinafter.

The cable connector 3 further comprises a locking device 36 (see FIG. 1A) with a box-shaped main body 37 having an open side 38 receiving the ferrule 9 and a closed side 39 with a cable passage 41. An upper face 42 of the main body 37 covers the upper web 27 of the release member 20, while a lower face 43 of the main body 37 covers the lower web 28 of the release member 20.

The locking device 36 has two symmetrically arranged mirrored latches 44 extending from the main body 37 pointing into the mating direction A. The latches 44 cover the side faces of the ferrule 9 and the U-shaped bridges 26 of the release member 20.

The front end 19 of the ferrule 9 is somewhat broader. The open side 38 of the main body 37 is bordered with a collar 45 for enclosing the broadened front end 19 of the ferrule 9 to limit the sliding movement of the ferrule relative to the release member (see FIG. 8A).

The latches 44 have a free end provided with a cam 46. The two cams 46 point to each other and project in mating direction A over a distance from the shutter 21. The upper and lower webs 27, 28 of the release member 20 are provided with ridges 40 creating a labyrinth between the shutter and the locking device 36 to protect the internals, in particular the optical coupling device 71 from dust. Internally, the compression springs 12 are compressed between the shoulder 16 and the inner surface of the main body 37 of the locking device 36.

Figure 8B:
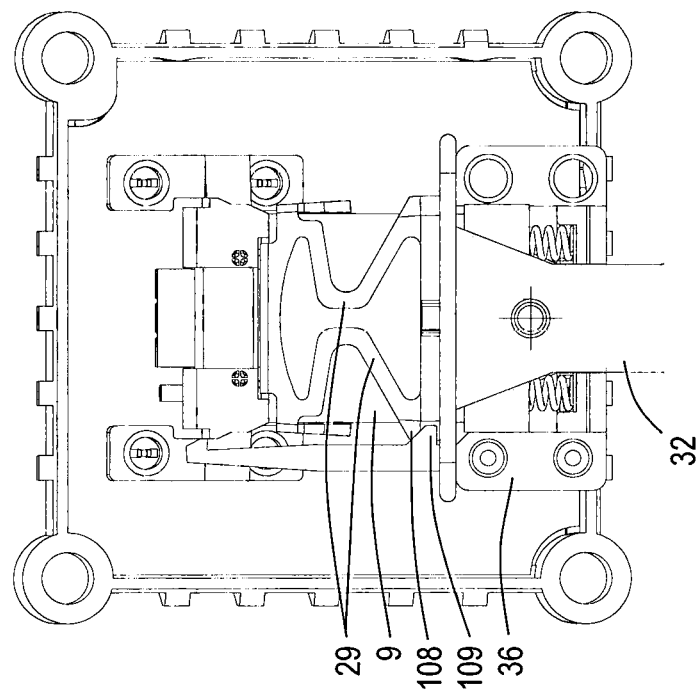
FIG. 8B: shows the two connectors in a cross section along a horizontal plane after being disconnected.
Figure 8A:
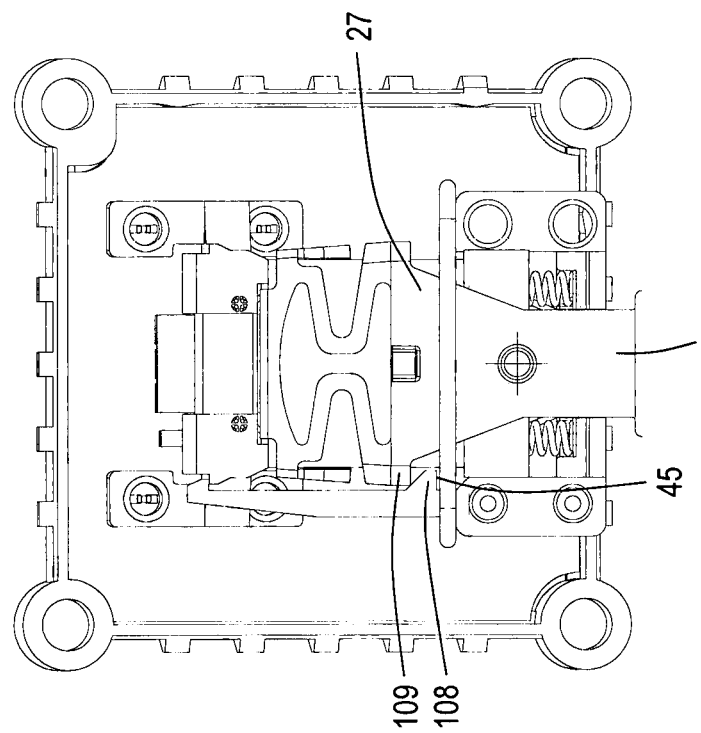
FIG. 8A: shows the two connectors in a cross section along a horizontal plane during disconnection.

The upper and lower webs 27, 28 of the release member 20 are both provided with a central projection 47 moveable in the mating direction A in a slit 48 at the topside and a bottom side of the main body 37, respectively (see FIGS. 8A and 8B).

The locking device 36 is formed by two identical angled parts 51, both having a short side 52 forming the lateral sides of the locking device 36, and a long side 53, forming the top and bottom sides of the locking device 36. The short and long sides 52, 53 of the parts 51 are under right angles. The latches 44 extend from the short sides. The short side 52 has one side edge connected to an end of longer side 53, while the opposite side edge comprises two parallel studs 54, which can be snapped into matching openings 56 in the longer side 53 of the other angled part 51 to form the assembled locking device 36. The two parts 51 are held together by an elastic band 57.

The exemplary embodiment of the board connector 2 as shown in the drawings is a transceiver with a top cover 61 with four corners bolted onto a rectangular lower housing section 62 holding an internal transceiver board 63 carrying the opto-electronic elements 91 and the feet 72 of the optical coupling device 71 (see FIG. 3A). The board connector 2 is mounted into a socket 65 mounted on a substrate 70, such as a printed circuit board (see FIG. 1A). The top cover 61 comprises a casing 64 with one side having a receiving opening 66 for receiving the cable connector 3. The top side 67 of the casing 64 slants downwardly from the side with the receiving opening 66 to the opposite side of the casing 64. A locking ring 68 with two opposite pinching grips 69 is put over the casing 64 to lock the board connector 2 in the socket 65.

The internals of the board connector 2 are shown in FIGS. 3a and 3B. An optical coupling device or optical coupling device 71 is positioned on the substrate 63 to face the optical fibers 15 of the optical connector 3 when it is received in the board connector 2. The optical coupling device 71 comprises two feet 72. Both feet 72 have two openings 73 filled with a cured adhesive 74 embedding an anchoring element 76 mounted on an internal connector substrate 63 (see FIG. 3C). Forces exerted to the optical coupling device 71 when the connectors 2, 3 are connected or disconnected, are absorbed as compression stresses and bending stresses by the anchoring elements besides internal shear stresses in the adhesive and peel stresses between the adhesive and the substrate. This way, the anchoring elements 76 contribute to a more reliable fixation of the optical coupling device member 71. In the embodiment shown in FIG. 3C, the anchoring element 76 is a capacitor 77 mounted on the board by two capacitor feet 78.

Between the feet 72 the optical coupling device member 71 carries two rectangular columns 79 sandwiching a prism 81. The prism 81 has a flat front face 82 with an array of lenses 83 facing the respective optical fiber ends 16 of the cable connector 3 when the connectors 2, 3 are connected. The array of lenses 83 is flanked by two symmetrically arranged parallel pegs 84 extending from the columns 79. The pegs 84 serve to open the shutter 21 of the optical cable connector 3 when the optical cable connector 3 is connected to the board connector 2.

Figure 4D:
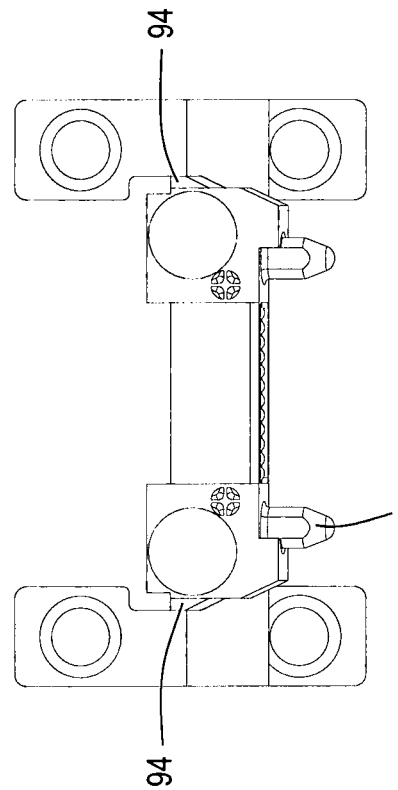
FIG. 4D: shows the optical coupling device member of FIG. 3A in bottom view.
Figure 4A:
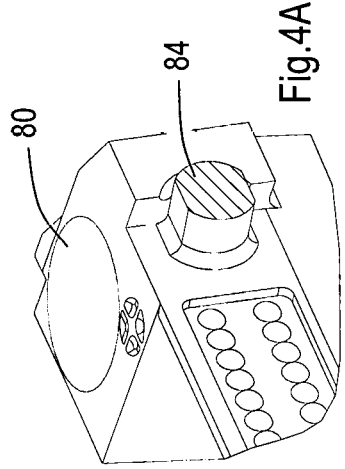
FIG. 4A: shows a detail of the optical coupling device member of FIG. 3A.
Figure 4B:
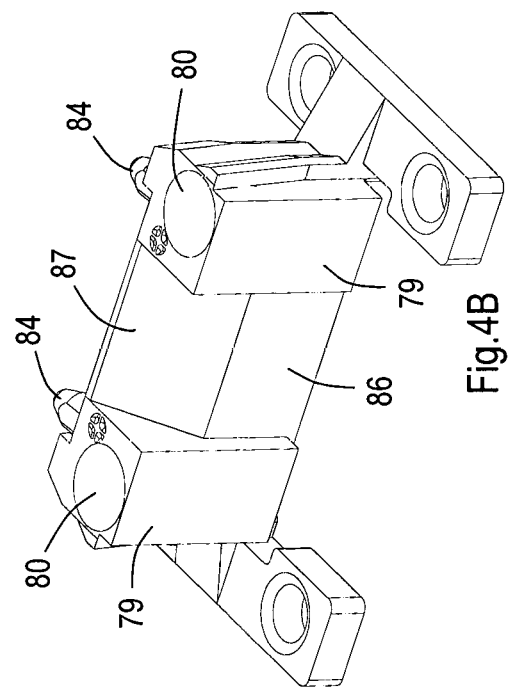
FIG. 4B: shows in perspective rear view the optical coupling device member of FIG. 3A.

The back side of the prism 81 (see FIG. 4B) has a vertical lower part 86 and a light reflective upper part 87 which slants under an angle to deflect light entering the prism 81 via the lenses 83 downwardly to the bottom 88, where the light leaves the optical coupling device 71 via a second array of lenses 89 (see FIG. 4D). Each lens 83 of the first array transfers light signals to a single lens 89 of the second array. The light is then received by an opto-electronic element 91, such as a VCEL or a PIN photo diode, located on the substrate 63 below the bottom side of the prism 81 (see FIG. 3A). The opto-electronic element 91 translates the light signals into electronic signals to be transferred via circuitry (not shown) printed on the substrate 63.

The tops 80 of the columns are configured as flat, substantially horizontal surfaces and are suitable for use with automated vacuum nozzles pick and place systems.

At the side of the feet 72 both columns 79 have a vertical ridge 94 (see FIGS. 4C and 7A) for cooperation with the latches 44 of the locking device 36 when the optical connector 3 is connected to the board connector 2, as will be explained hereinafter.

FIG. 6A shows in cross section the cable connector 3 approaching the board connector 2 just before being connected. The receiving opening 66 of the top cover 61 is closed by a flap 100 connected to the lower edge of the receiving opening 66 by means of a hinge 101, allowing movement of the flap 100 between a first position closing off the receiving opening 66, as shown in FIG. 6A, and a second position, where the flap 100 is folded backwards towards the optical coupling device 71. A torsion spring 110 biases the flap 100 to the closing position, where it abuts a stop 102 at the edge of the receiving opening 66.

The VCEL's or photo PIN diodes 91 comprise drivers 105 generating heat. The interior of the top cover 61 is profiled to tightly contact the top surfaces of the drivers 105 in such a way that no air gap remains between the top cover 61 and these respective surfaces. This enables effective dissipation via the top cover 61. The top cover 61 comprises an inwardly protruding vertical brim 111 fitting against the back face of the optical coupling device and covering the drivers 105. Air gaps and inclusions can be avoided by applying an air gap filler material between the drivers and the inner surface of the top cover.

When the cable connector 3 is inserted into the receiving opening 66 of the board connector 2, the flap 100 is folded down and the plug 4 is pushed towards the optical coupling device 71 until the shutter 21 hits the pegs 84. The pegs 84 are cylindrical with flattened upper and lower sides (see FIG. 4A) dimensioned to wedge the split 25 between the upper and lower blades 22, 23 of the shutter. As a result the upper and lower blades 22, 23 are forced apart against the action of the resilient U-shaped bridges 26 of the release member 20. In this position, the fiber ends 15 are exposed (see FIG. 5B). Pushing the plug 4 further into the board connector 3 will insert the pegs 84 into the smaller diameter opening 13 in the ferrule 9 (see also FIG. 7A). The pegs 84 are dimensioned to snugly fit within the openings 13 to enable very accurate positioning of the fiber ends 15 relative to the lenses 83 of the optical coupling device 71 (see FIG. 7A).

Figure 7A:
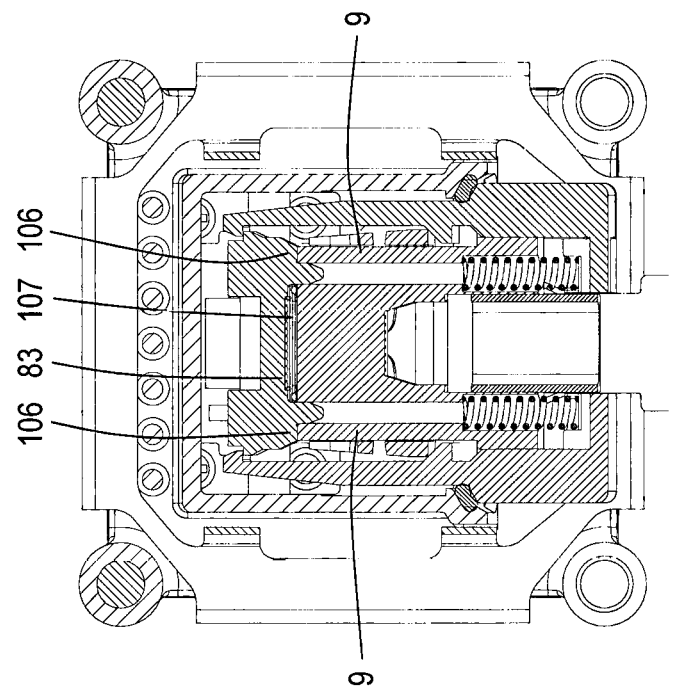
FIG. 7A: shows the two connectors in a cross section along a horizontal plane during mating.
Figure 7B:
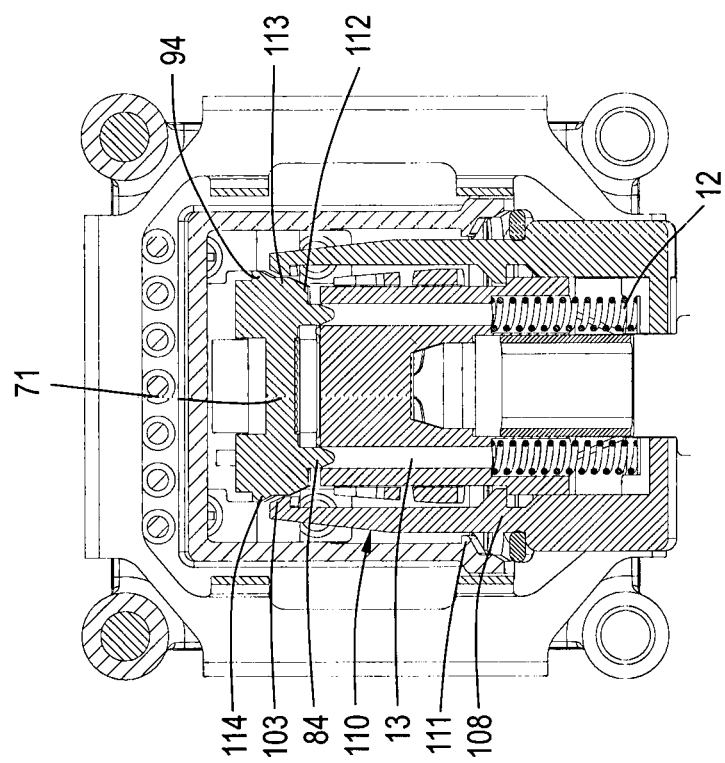
FIG. 7B: shows the two connectors in a cross section along a horizontal plane after being mated.

The mating process is shown from above in FIGS. 7a and 7B. During positioning respective contact faces 103 of the cams 46 of the latches 44 encounter parallel contact faces 114 the vertical lateral ridges 94 of the optical coupling device 71. Meanwhile, the outer end of the ferrule 9 encounters spacers 106 of the optical coupling device 71 right next to the pegs 84. The spacers 106 are dimensioned to space the fiber ends 15 very accurately at a desired distance from the lenses 83 of the optical coupling device 71, forming a gap 107 of uniform width. Although the ferrule 9 is stopped by the spacers 106, the locking device 36 can be pushed further inwardly against the action of the compression springs 12 until the cams 46 of the latches 44 hook behind the ridges 94, preventing unintentional disconnection of the connectors 2, 3. In this position, the compression springs 12 exert a continuous pressure pressing the plug 4 against the optical coupling device 71, fixating the fibers ends 15 relative to the lenses 83, which contributes to the overall reliability of the connector system.

The connectors 2, 3 can be disconnected by pulling the pull tab 32. In the locked position the contact end of the connector 2 is fit between the inner surfaces of the board connector 3 in such way that the shutter blades cannot be moved apart by pulling the pull tab 32. The mirrored pair of C-shaped resilient members 29, 31 is stretched, while the locking device 36 and the ferrule 9 stay in place. The latches 44 have a slanting base 108 forming a contact face of a pushing section 109 of the release member 20. The pushing section 109 is positioned at a point where the C-shaped resilient member 29, 31 is linked to the upper web 27, or to the lower web 28 respectively. The pushing section 109 projects over a lateral distance from the upper and lower webs 27, 28. The pushing section 109 presses against the contact face 108 of the latches 44. As a result, the latches 44 are pushed aside and eventually unhooked from the ridges 94. The compression springs 12 and the C-shaped resilient members 29, 31 are now allowed to relax. The locking device 36 is pushed backwardly by the springs 12. This contributes to easier removal of the cable connector 3.

Alternative embodiments of the optical coupling device are shown in FIGS. 9A-C. These embodiments have feet extending at only one side of the respective support. In FIG. 9A the coupling device 120 comprises oppositely extending feet. In FIGS. 9B and 9C the feet extend in the direction of the contact face (FIG. 9C) and in the opposite direction (FIG. 9B), respectively.

The invention claimed is:

1. Opto-electric on-board connector comprising:
a top cover,
a lower housing section,
opto-electronic elements on an internal connector substrate, and
an optical coupling device for transferring optical signals between the opto-electronic elements and a complementary optical cable connector,
wherein the internal connector substrate is between the top cover and the lower housing section;
wherein the optical coupling device comprises a prism with a contact face and a lower face;
wherein the optical coupling device further comprises two supports supporting the prism therebetween and spacing the lower face from the oppositely arranged opto-electronic elements;
wherein each support comprises two feet extending in opposite directions and attached to the internal connector substrate; and
wherein a first foot of the two feet extends in a direction of the contact face and a second foot of the two feet extends in a direction opposite to the direction of the contact face.

2. A connector according to claim 1, wherein the internal connector substrate carries the opto-electronic elements and the supports of the optical coupling device.

3. A connector according to claim 1, wherein the feet of the two supports are parallel.

4. A connector according to claim 3, wherein the two feet extending in the opposite directions for each support define an H-shape of the optical coupling device on a surface of the internal connector substrate.

5. A connector according to claim 1, wherein the opto-electronic elements on the internal connector substrate include VCEL's and/or PIN photo-diodes with drivers arranged between the feet of the optical coupling device supports.

6. Opto-electric on-board connector comprising:
a top cover,
a lower housing section,
opto-electronic elements on an internal connector substrate, and
an optical coupling device for transferring optical signals between the opto-electronic elements and a complementary optical cable connector,
wherein the internal connector substrate is between the top cover and the lower housing section;
wherein the optical coupling device comprises a prism with a contact face and a lower face;
wherein the optical coupling device further comprises two or more supports supporting the prism and spacing the lower face from the oppositely arranged opto-electronic elements; and
wherein each support comprises one or more feet attached to the internal connector substrate,
wherein the opto-electronic elements on the internal connector substrate include VCEL's and/or PIN photo-diodes with drivers arranged between the feet of the optical coupling device supports, and
wherein the top cover comprises an interior surface profiled to provide a tight contact with the upper surfaces of the drivers.

7. A connector according to claim 6, wherein a thermally conductive air gap filter material is applied between the upper surfaces of the drivers and the interior surface.

8. A connector according to claim 1, wherein the prism comprises a light-reflective back face under an angle to guide optical signals from each lens of a first array of the contact face to an associated lens of a second array at the prisms' lower surface.

9. A connector according to claim 1, wherein the optical coupling device comprises alignment features flanking a first array of lenses of the prism, the alignment features matching with corresponding alignment features of a complementary cable connector.

10. A connector according to claim 9, wherein the alignment features of the optical coupling device include parallel alignment pins extending in a direction under right angles with the contact face.

11. Opto-electric on-board connector comprising:
a top cover,
a lower housing section,
opto-electronic elements on an internal connector substrate, and
an optical coupling device for transferring optical signals between the opto-electronic elements and a complementary optical cable connector,
wherein the internal connector substrate is between the top cover and the lower housing section;
wherein the optical coupling device comprises a prism with a contact face and a lower face;
wherein the optical coupling device further comprises two or more supports supporting the prism and spacing the lower face from the oppositely arranged opto-electronic elements; and
wherein each support comprises a rectangular column with one or more feet attached to the internal connector substrate, a foot of the one or more feet extending at a right angle from the base of the rectangular column, and
wherein the supports have side faces profiled to cooperate with latches of a complementary cable connector.

12. A connector according to claim 11, wherein the rectangular columns are provided with flat, substantially horizontal top faces.

13. A connector according to claim 11, wherein the contact face comprises a first array of lenses, each lens being configured to face an individual optical fiber end of a complementary cable connector.

14. A connector according to claim 13, wherein the lower face of the optical coupling device is provided with a second array of lenses, wherein each lens of the second array is spaced from an oppositely arranged associated opto-electronic element.

15. A connector according to claim 1, wherein the lower housing section surrounds the internal connector substrate.

16. A connector according to claim 1, wherein at least a portion of the lower housing section is configured to be between the internal connector substrate and a printed circuit board.

17. The connector according to claim 11, wherein each of the supports have a vertical ridge along the side faces to cooperate with the latches of the complementary cable connector.

18. The connector according to claim 11, wherein the foot of one of the supports extends in a direction of the contact face and the foot of another of the supports extends in a direction opposite to the direction of the contact face.

19. The connector according to claim 11, wherein the feet of the supports extend in a direction of the contact face.

20. The connector according to claim 11, wherein the feet of the supports extend in a direction opposite to a direction of the contact face.

* * * * *

UNITED STATES PATENT AND TRADEMARK OFFICE
CERTIFICATE OF CORRECTION

PATENT NO. : 9,784,929 B2  
APPLICATION NO. : 14/438248  
DATED : October 10, 2017  
INVENTOR(S) : Gert Julien Droesbeke Page 1 of 1

It is certified that error appears in the above-identified patent and that said Letters Patent is hereby corrected as shown below:

On the Title Page

Item (73), Assignee's address:  
Should read -- Singapore (SG) --.

Item (57), Line 1 of the Abstract:  
Opto-electric on-board including opto-electronic elements  
Should read -- Opto-electric on-board connector including opto-electronic elements --.

Signed and Sealed this  
Third Day of July, 2018

Andrei Iancu  
*Director of the United States Patent and Trademark Office*